US012512059B2

(12) United States Patent
You

(10) Patent No.: US 12,512,059 B2
(45) **Date of Patent: *Dec. 30, 2025**

(54) DISPLAY DEVICE

(71) Applicant: LG Display Co., Ltd., Seoul (KR)

(72) Inventor: Jaeyong You, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,305

(22) Filed: Sep. 16, 2024

(65) Prior Publication Data

US 2025/0006130 A1 Jan. 2, 2025

Related U.S. Application Data

(63) Continuation of application No. 18/350,688, filed on Jul. 11, 2023, now Pat. No. 12,118,941, which is a (Continued)

(30) Foreign Application Priority Data

Dec. 21, 2020 (KR) ........................ 10-2020-0179838

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2330/028* (2013.01)

(58) Field of Classification Search
CPC .. G09G 3/3208; G09G 3/3225; G09G 3/3233; G09G 3/3266; G09G 3/3291;
(Continued)

(56) References Cited

U.S. PATENT DOCUMENTS 10,373,563 B2 8/2019 Park et al.
10,388,219 B2 8/2019 Lee et al.
(Continued)

FOREIGN PATENT DOCUMENTS

CN 107564475 A 1/2018
CN 107564476 A 1/2018
(Continued)

*Primary Examiner* — Stacy Khoo
(74) *Attorney, Agent, or Firm* — Seed Intellectual Property Law Group LLP

(57) ABSTRACT

A display device includes a display panel on which gate lines, data lines and subpixels are disposed; a gate driving circuit which drives the gate lines; and a data driving circuit which drives the data lines. Each of the subpixels includes: a light emitting device; a second transistor which has a first node, a second node that is a gate node, and a third node electrically connected to the light emitting device, and drives the light emitting device; a first transistor electrically connected between the third node and the data line; a third transistor electrically connected between the first node and the second node; and a fourth transistor electrically connected between the third node and the light emitting device. The third transistor performs a turn-off operation later than the first transistor, so that a voltage applied to the third node is transmitted to the second node via the first node.

18 Claims, 11 Drawing Sheets

Related U.S. Application Data continuation of application No. 17/553,727, filed on Dec. 16, 2021, now Pat. No. 11,735,110.

(58) Field of Classification Search

CPC ... G09G 2300/0819; G09G 2300/0852; G09G 2300/0861; G09G 2310/0262; G09G 2310/0294; G09G 2310/061; G09G 2310/067; G09G 2320/0233; G09G 2330/028

See application file for complete search history.

(56) References Cited

U.S. PATENT DOCUMENTS

| | | | | |
|---|---|---|---|---|
| 10,475,381 | B2 | 11/2019 | Yoon et al. | |
| 10,937,370 | B2 | 3/2021 | Son | |
| 12,118,941 | B2 * | 10/2024 | You | G09G 3/3291 |
| 2012/0001896 | A1 | 1/2012 | Han et al. | |
| 2016/0351121 | A1 | 12/2016 | Kim et al. | |
| 2017/0092200 | A1 | 3/2017 | Park et al. | |
| 2018/0174553 | A1 | 6/2018 | Bong et al. | |
| 2019/0066580 | A1 | 2/2019 | Xu | |
| 2020/0160788 | A1 | 5/2020 | Son | |
| 2021/0091163 | A1 | 3/2021 | Son | |
| 2021/0193040 | A1 | 6/2021 | Na | |
| 2021/0201786 | A1 | 7/2021 | Ma | |

FOREIGN PATENT DOCUMENTS

| | | | |
|---|---|---|---|
| KR | 20170039052 | A | 4/2017 |
| KR | 20190040849 | A | 4/2019 |
| KR | 20200057204 | A | 5/2020 |
| KR | 20200062742 | A | 6/2020 |
| KR | 20200071275 | A | 6/2020 |

* cited by examiner

DISPLAY DEVICE

CROSS-REFERENCE TO RELATED APPLICATION(S)

This application is a continuation of U.S. patent application Ser. No. 18/350,688, filed Jul. 11, 2023, which is a continuation of U.S. patent application Ser. No. 17/553,727, filed Dec. 16, 2021, which claims the benefit of Korean Patent Application No. 10-2020-0179838 filed on Dec. 21, 2020, the entire contents of which are incorporated herein by reference for all purposes as if fully set forth herein.

BACKGROUND

Technical Field

The present disclosure relates to a display device which compensates a threshold voltage Vth of a driving transistor according to a source follower internal compensation method.

Description of the Related Art

An active matrix type organic light emitting diode display device includes an organic light emitting diode (OLED) which emits light by itself, and has an advantage of having a rapid response speed, a high light emission efficiency, a high luminance, and a wide viewing angle.

The organic light emitting diode, which is a self-light emitting device, includes an anode electrode, a cathode electrode, and an organic compound layer (HIL, HTL, EML, ETL, and EIL) formed therebetween. The organic compound layer includes a hole injection layer (HIL), a hole transport layer (HTL), an emission layer (EML), an electron transport layer (ETL) and an electron injection layer (EIL). When a driving voltage is applied to the anode and cathode electrodes, holes passing through the hole transport layer (HTL) and electrons passing through the electron transport layer (ETL) move to the emission layer (EML) to form excitons, and as a result, the emission layer (EML) generates visible light.

An organic light emitting display device includes a driving transistor to control a driving current flowing through the organic light emitting diode. It is preferable that the electrical characteristics of the driving transistor such as a threshold voltage Vth and mobility are designed the same in all the pixels. In practice, however, the electrical characteristics of the driving transistor are non-uniform for each pixel due to process conditions and driving environment. For this reason, the driving current according to the same data voltage changes for each pixel, and as a result, a luminance deviation occurs between the pixels. In order to solve this problem, known is an image quality compensation technique for reducing luminance non-uniformity by sensing characteristic parameters (threshold voltage Vth, mobility) of the driving transistor from each pixel and by appropriately correcting input data in accordance with the sensing result.

Among the image quality compensation techniques, an internal compensation method controls a pixel structure and a drive timing to exclude the electrical characteristics of the driving transistor while the organic light emitting diode emits light. The internal compensation method basically performs a sampling operation of saturating the driving transistor to a certain level by increasing a gate voltage of the driving transistor in a source follower manner. In the internal compensation method, sufficient time is required to saturate the gate voltage of the driving transistor to a desired level.

BRIEF SUMMARY

Technical Problem

The inventors have realized that, in the trend of high-resolution and high-speed driving of the organic light emitting display device, the difference in drive characteristics of the pixel cannot be sufficiently compensated by a conventional compensation method. For example, as a resolution increases and a driving frequency increases, one horizontal period during which data is written to the pixels in one line in a display panel is reduced. One horizontal period is a time for writing data to pixels arranged in one horizontal line on the screen.

A driving circuit of the organic light emitting display device samples the threshold voltage of the driving transistor within one horizontal period, compensates a data voltage by the threshold voltage, and writes the data to the pixels. When the one horizontal period is reduced, a threshold voltage sampling period of the driving transistor is reduced. If a time required for sampling the threshold voltage of the driving transistor is insufficient, the threshold voltage of the driving transistor is incorrectly sensed, so that the difference in drive characteristics between the pixels may occur. Even though data of the same gradation is written to all the pixels, the difference in drive characteristics between the pixels causes a difference in luminance, so that spots may be seen on the screen.

The present disclosure relates a display device having an internal compensation circuit. The width of a gate ON pulse of a compensation transistor is made greater than the width of a gate ON pulse of a scan transistor, so that a threshold voltage of a driving transistor is additionally sampled even after one horizontal period. Also, the compensation transistor which is connected to a source electrode of the driving transistor is additionally provided, so that a data voltage applied to the source electrode can be maintained during an additional sampling period.

The display device according to the present disclosure has the following embodiments.

Technical Solution

In accordance with at least one embodiment, a display device includes: a display panel on which a plurality of gate lines, a plurality of data lines and a plurality of subpixels are disposed; a gate driving circuit which drives the plurality of gate lines; and a data driving circuit which drives the plurality of data lines. Each of the plurality of subpixels includes: a light emitting device; a second transistor which includes a first node, a second node that is a gate node, and a third node electrically connected to the light emitting device, and drives the light emitting device; a first transistor electrically connected between the third node and the data line; a third transistor electrically connected between the first node and the second node; and a fourth transistor electrically connected between the third node and the light emitting device. The third transistor performs a turn-off operation later than the first transistor, which will cause a voltage applied to the third node is transmitted to the second node via the first node during a selected time period.

The third transistor performs a turn-on operation prior to the first transistor.

The third transistor performs the turn-off operation prior to a point of time when the fourth transistor performs the turn-on operation.

Each of the plurality of subpixels further includes a compensation capacitor composed of or including a first electrode and a second electrode. The first electrode of the compensation capacitor is connected to the third node.

The second electrode of the compensation capacitor is configured to be connected to a driving voltage line and receives a high potential power supply voltage.

The second electrode of the compensation capacitor is configured to be connected to an initialization voltage line and receives an initialization voltage.

The first transistor and the second transistor are composed of or include an oxide semiconductor transistor which uses an oxide semiconductor material as an active layer.

The third transistor is composed of or includes an oxide semiconductor transistor which uses an oxide semiconductor material as an active layer.

The first node is electrically connected to a driving voltage line. Each of the plurality of subpixels further includes a fifth transistor electrically connected between the first node and the driving voltage line. The fourth transistor and the fifth transistor perform the turn-off operation in a period in which the third transistor and the first transistor perform a turn-on operation.

Another embodiment is a display device including: a display panel on which a plurality of gate lines, a plurality of data lines and a plurality of subpixels are disposed; a data driving circuit which provides a data signal to the data lines; and a gate driving circuit which provides a gate signal to the gate lines. Each of the plurality of subpixels includes: a light emitting device; a second transistor which includes a first node electrically connected to a driving voltage line, a second node that is a gate node, and a third node electrically connected to the light emitting device, and drives the light emitting device; a first transistor electrically connected between the third node and the data line; a third transistor electrically connected between the first node and the second node; a fourth transistor which includes the third node and a fourth node electrically connected to the light emitting device; a fifth transistor electrically connected between the first node and the driving voltage line; a sixth transistor electrically connected between the light emitting device and an initialization voltage line; and a capacitor electrically connected between the second node and the fourth node. The gate signal includes: a first scan signal which controls an on/off operation (e.g., on operation and off operation) of the third transistor and the sixth transistor; a second scan signal which controls an on/off operation of the first transistor; a first light emission signal which controls an on/off operation of the fourth transistor; and a second light emission signal which controls an on/off operation of the fifth transistor. An ON pulse of the first scan signal is wider than an ON pulse of the second scan signal.

A point of time when the first scan signal is switched from a high level to a low level is later than a point of time when the second scan signal is switched from the high level to the low level.

A point of time when the first scan signal is switched from the low level to the high level is earlier than a point of time when the second scan signal is switched from the low level to the high level.

A point of time when the first scan signal is switched from the high level to the low level is earlier than a point of time when the first light emission signal is switched from the low level to the high level.

Each of the plurality of subpixels further includes a compensation capacitor composed of or including a first electrode and a second electrode. The first electrode of the compensation capacitor is connected to the third node.

The second electrode of the compensation capacitor may be configured to be connected to a driving voltage line and receives a high potential power supply voltage.

The second electrode of the compensation capacitor may be configured to be connected to an initialization voltage line and receives an initialization voltage.

The first transistor, the second transistor, and the fifth transistor are composed of or include an oxide semiconductor transistor which uses an oxide semiconductor material as an active layer.

The third transistor and the sixth transistor are composed of or include an oxide semiconductor transistor which uses an oxide semiconductor material as an active layer.

When the first scan signal and the second scan signal are high-level signals, the first light emission signal and the second light emission signal are low-level signals.

Yet another embodiment is a display device including: a display panel on which a plurality of gate lines, a plurality of data lines and a plurality of subpixels are disposed; a data driving circuit which provides a data signal to the data lines; and a gate driving circuit which provides a gate signal to the gate lines. Each of the plurality of subpixels includes: a light emitting device; a second transistor which includes a first node electrically connected to a driving voltage line, a second node that is a gate node, and a third node electrically connected to the light emitting device, and drives the light emitting device; a first transistor electrically connected between the third node and the data line; a third transistor electrically connected between the first node and the second node; a fourth transistor which includes the third node and a fourth node electrically connected to the light emitting device; a fifth transistor electrically connected between the first node and the driving voltage line; a sixth transistor electrically connected between the light emitting device and an initialization voltage line; and a capacitor electrically connected between the second node and the fourth node.

The gate signal includes: a first scan signal which controls an on/off operation of the third transistor and the sixth transistor; a second scan signal which controls an on/off operation of the first transistor; a first light emission signal which controls an on/off operation of the fourth transistor; and a second light emission signal which controls an on/off operation of the fifth transistor. The first scan signal includes a first ON pulse and a second ON pulse following the first ON pulse. A point of time when the second ON pulse is switched from a high level to a low level is later than a point of time when the second scan signal is switched from the high level to the low level.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Hereinafter, embodiments of the present disclosure will be described with reference to the accompanying drawings. Throughout the disclosure, the same references mean substantially the same components. In the following description, the detailed description of known functions and configurations incorporated related to the present disclosure is omitted when it may make the subject matter of the present disclosure rather unclear. Also, the component names used in the following description may be selected in consideration of making it easier to write the specification and may be different from the component names of an actual product.

In describing the components of the present disclosure, terms such as the first, the second, A, B, (a), (b), etc., can be used. Such terms are used only to distinguish one component from other components, and the essence, order, or number, etc., of the component are not limited by the terms. When it is said that a component is "connected," "coupled" or "accessed" to another component, it should be understood that not only the component may be directly connected or accessed to that other component, but also another component may be "interposed" between respective components or each component may be "connected," "coupled," or "accessed" by other components.

Figure 1:
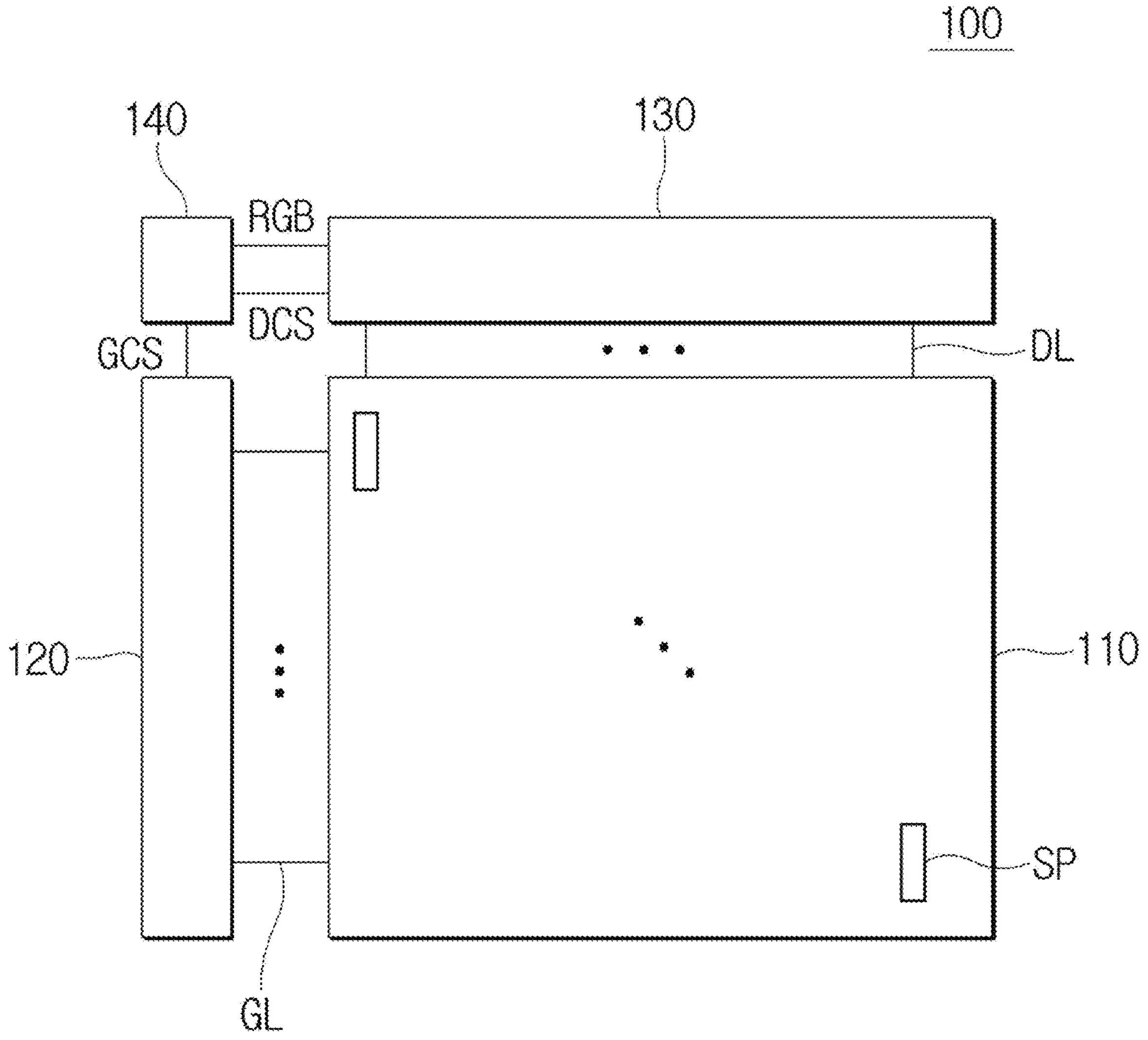
FIG. 1 shows a schematic configuration of a display device according to an embodiment.

FIG. 1 shows a schematic configuration of a display device 100 according to the embodiments of the present disclosure.

Referring to FIG. 1, the display device 100 according to embodiments of the present disclosure includes a display panel 110 in which a plurality of subpixels SP are arranged, a gate driving circuit 120, a data driving circuit 130, and a controller 140 which are for driving the display panel 110, and the like.

In the display panel 110, a plurality of gate lines GL and a plurality of data lines DL are arranged, and the subpixel SP is arranged in a region of overlap of the gate line GL and the data line DL.

The gate driving circuit 120 is controlled by the controller 140, and sequentially outputs a scan signal to the plurality of gate lines GL arranged on the display panel 110 to control a drive timing of the plurality of subpixels SP.

In some cases, such a gate driving circuit 120 may output a scan signal for controlling the drive timing of the subpixel SP and a light emission signal for controlling a light emission timing of the subpixel SP. In this case, the circuit for outputting the scan signal and the circuit for outputting the light emission signal may be implemented as separate circuits or as a single circuit.

The gate driving circuit 120 may include one or more gate driver integrated circuits (GDIC), and may be located on only one side or on both sides of the display panel 110 depending on the driving method.

Each gate driver integrated circuit (GDIC) may be connected to a bonding pad of the display panel 110 by a tape automated bonding (TAB) method, by a chip on glass (COG) method, or by a chip on Pi (COP) method, or may be implemented in a Gate-In Panel (GIP) type and disposed directly on the display panel 110. In some cases, each gate driver integrated circuit (GDIC) may be integrated and disposed on the display panel 110. Also, each gate driver integrated circuit (GDIC) may be implemented by a chip on film (COF) method in which each gate driver integrated circuit (GDIC) is mounted on a film connected to the display panel 110.

The data driving circuit 130 receives an image data from the controller 140 and converts the image data into a data voltage in analog form. Also, the data driving circuit 130 outputs the data voltage to each data line DL in accordance with a timing at which the scan signal is applied through the gate line GL, so that each subpixel SP represents brightness according to the image data.

The data driving circuit 130 may include one or more source driver integrated circuits (SDIC).

Each source driver integrated circuit (SDIC) may include a shift register, a latch circuit, a digital to analog converter (DAC), an output buffer, and the like.

Each source driver integrated circuit (SDIC) may be connected to a bonding pad of the display panel 110 by the tape automated bonding (TAB) method, by a chip on glass (COG) method, or by a chip on Pi (COP) method, or may be directly disposed on the display panel 110, or, in some cases, may be integrated and disposed on the display panel 110. Also, each source driver integrated circuit (SDIC) may be implemented in a chip on film (COF) method. In this case, each source driver integrated circuit (SDIC) may be mounted on a film connected to the display panel 110 and may be electrically connected to the display panel 110 through wires on the film.

The controller 140 supplies various control signals to the gate driving circuit 120 and the data driving circuit 130 and controls operations of the gate driving circuit 120 and the data driving circuit 130.

The controller 140 may be mounted on a printed circuit board, a flexible printed circuit, etc., and may be electrically connected to the gate driving circuit 120 and the data driving circuit 130 through the printed circuit board, the flexible printed circuit, etc.

The controller 140 causes the gate driving circuit 120 to output a scan signal according to a timing generated in each frame, converts an image data received from the outside in accordance with a data signal format used by the data driving circuit 130, and outputs the converted image data RGB to the data driving circuit 130.

The controller 140 receives, together with the image data, various timing signals including a vertical synchronization signal VSYNC, a horizontal synchronization signal HSYNC, an input data enable signal DE, and a clock signal CLK from the outside (e.g., a host system).

The controller 140 may generate various control signals by using various timing signals received from the outside and may output them to the gate driving circuit 120 and the data driving circuit 130.

For example, in order to control the gate driving circuit 120, the controller 140 outputs various gate control signals GCS including a gate start pulse (GSP), a gate shift clock (GSC), a gate output enable signal (GOE), etc.

Here, the gate start pulse (GSP) controls an operation start timing of one or more gate driver integrated circuits (GDIC) which constitutes the gate driving circuit 120. The gate shift clock (GSC) is a clock signal which is commonly input to one or more gate driver integrated circuits (GDIC). The gate shift clock (GSC) controls a shift timing of the scan signal. The gate output enable signal (GOE) designates timing information of one or more gate driver integrated circuits (GDIC).

Also, in order to control the data driving circuit 130, the controller 140 outputs various data control signals DCS including a source start pulse (SSP), a source sampling clock (SSC), a source output enable signal (SOE), etc.

Here, the source start pulse (SSP) controls a data sampling start timing of one or more source driver integrated circuits (SDIC) which constitutes the data driving circuit 130. The source sampling clock (SSC) is a clock signal which controls a sampling timing of data in each of the source driver integrated circuits (SDIC). The source output enable signal (SOE) controls an output timing of the data driving circuit 130.

The display device 100 may further include a power management integrated circuit (not shown) which supplies various voltages or currents to the display panel 110, the gate driving circuit 120, the data driving circuit 130, etc., or controls various voltages or currents to be supplied.

Each subpixel SP may be defined by the overlap of the gate line GL and the data line DL, and a liquid crystal or a light emitting device EL may be disposed depending on the type of the display device 100.

Figure 2:
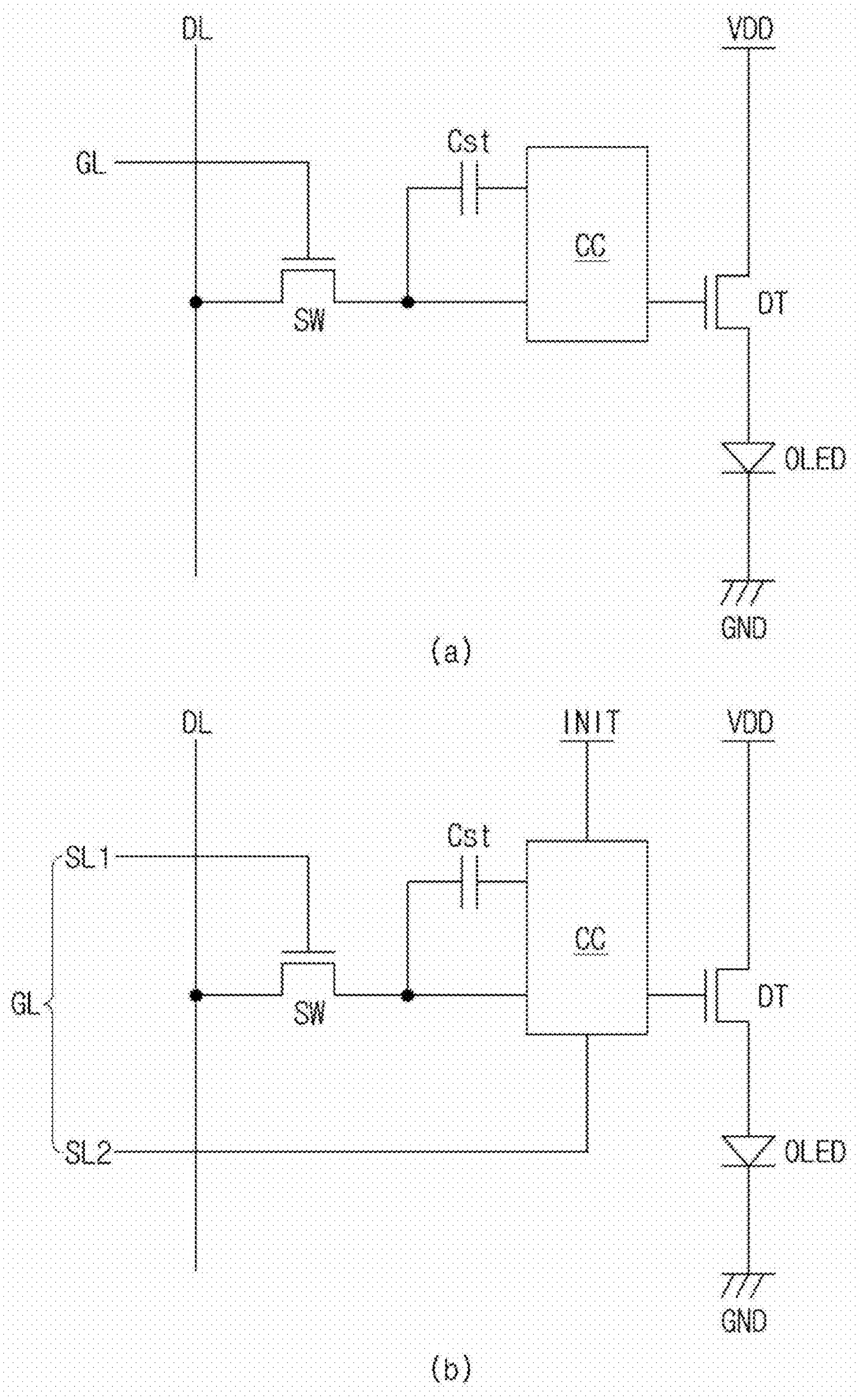
FIG. 2 shows an example of a subpixel structure.

An example of a subpixel structure according to the embodiment is shown in (a) and (b) of FIG. 2.

Referring to (a) of FIG. 2, one subpixel includes a switching transistor SW, a driving transistor DT, a compensation circuit CC, and an organic light emitting diode OLED. The organic light emitting diode OLED operates to emit light in accordance with a driving current generated by the driving transistor DT.

The switching transistor SW performs a switching operation such that a data signal supplied through the data line DL in response to a gate signal supplied through the gate line GL is stored as a data voltage in a capacitor Cst. The driving transistor DT operates such that a driving current flows between a high potential power supply voltage VDD and a low potential power supply voltage GND in accordance with the data voltage stored in the capacitor Cst. The compensation circuit CC is for compensating a threshold voltage Vth of the driving transistor DT, etc. Meanwhile, according to various embodiments, the capacitor Cst connected to the switching transistor SW or the driving transistor DT may be located within the compensation circuit CC.

The compensation circuit CC is composed of or includes one or more thin film transistors and a capacitor. The compensation circuit CC may be configured in a wide variety of ways according to a compensation method.

Also, as shown in (b) of FIG. 2, when the compensation circuit CC is included, the subpixel may further include a signal line SL1 and SL2 (i.e., gate line GL), a power line INIT, etc., which are for driving a compensation thin film transistor and for supplying a specific signal or electric power.

Hereinafter, a case in which the compensation circuit CC is composed of or includes four transistors will be described as an example.

Figure 3:
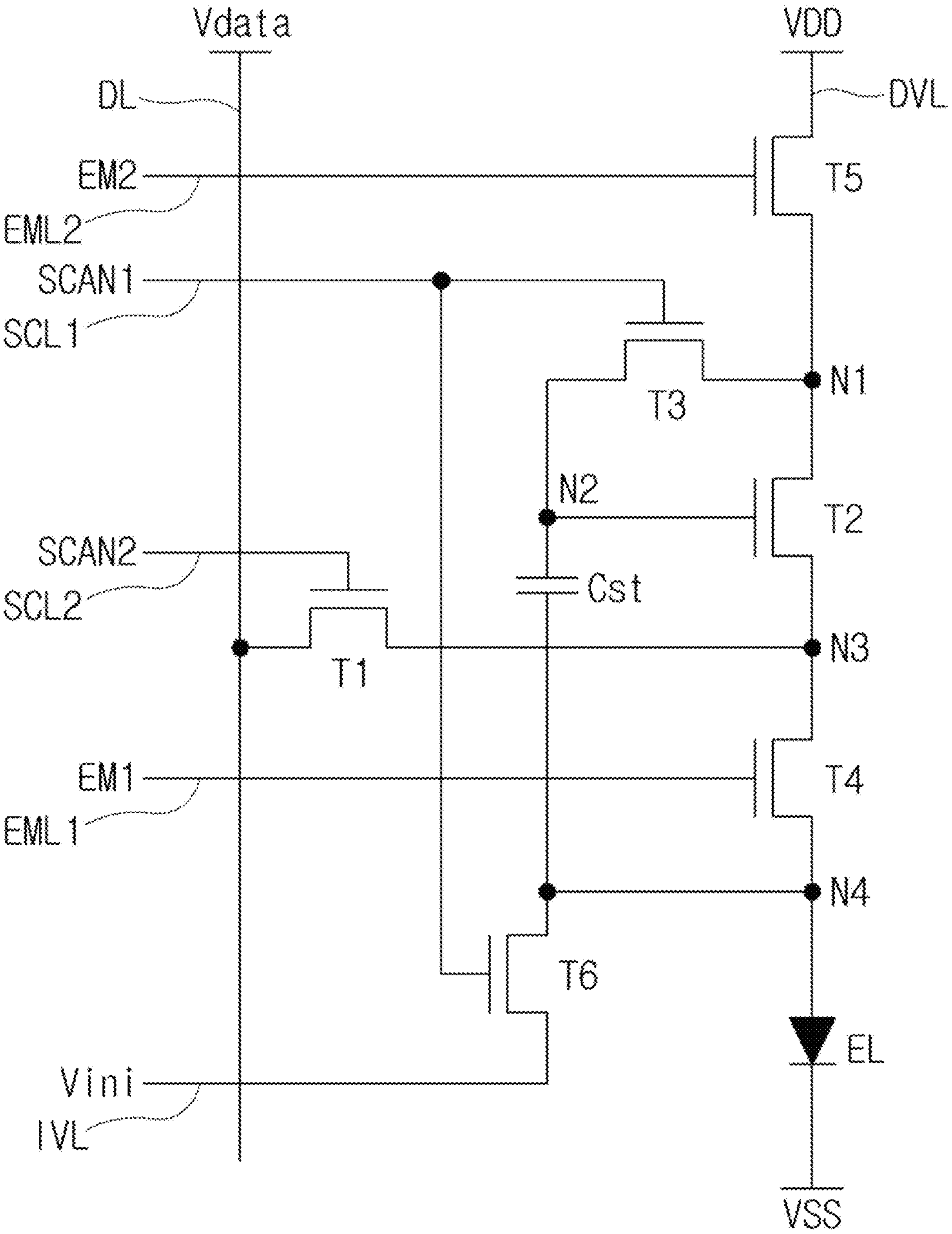
FIG. 3 shows an example of the structure of a subpixel circuit arranged in the display device according to the embodiments.

FIG. 3 shows an example of a circuit structure of the subpixel arranged in the display device according to the embodiments.

Referring to FIG. 3, in the subpixel SP of the display device 100 according to embodiments of the present disclosure, for example, a light emitting device EL, a plurality of transistors T1, T2, T3, T4, T5, and T6, and one capacitor Cst may be disposed. Here, T3, T4, T5, and T6 correspond to the compensation circuit CC described with reference to FIG. 2.

Meanwhile, in the example shown in FIG. 3, the subpixel SP composed of or includes 6T1C is shown as an example. However, a circuit element disposed in the subpixel SP can be implemented in various ways depending on the type of the display device 100. Also, although FIG. 3 shows that the transistor disposed in the subpixel SP is an N-type transistor, the subpixel SP may be composed of or include a P-type transistor in some cases. When the subpixel SP is composed of or includes a P-type transistor, scan waveforms SCAN1 and SCAN2 may have a polarity opposite to that of the scan waveforms of the subpixel SP composed of or including an N-type transistor.

When the subpixel SP is composed of or includes 6T1C, the six transistors T1, T2, T3, T4, T5, and T6 and one capacitor Cst may be disposed in each subpixel SP.

The first transistor T1 may be controlled by a second scan signal SCAN2 applied to a second scan line SCL2 and may be electrically connected between a third node N3 and the data line DL to which the data voltage Vdata is applied. Such a first transistor T1 may also be referred to as "scan transistor".

The second transistor T2 may have a first node N1, a second node N2, and a third node N3. The first node N1 may be a drain node or a source node and may be electrically connected to a driving voltage line DVL. The second node N2 may be a gate node. The third node N3 may be a source node or a drain node and may be electrically connected to an anode electrode of the light emitting device EL. Such a second transistor T2 may also be referred to as a "driving transistor".

The third transistor T3 is controlled by a first scan signal SCAN1 applied to a first scan line SCL1 and may be electrically connected between the second node N2 and the first node N1 of the second transistor T2. Such a third transistor T3 may also be referred to as a "compensation transistor".

The fourth transistor T4 may be controlled by a first light emission signal EM1 applied to a first light emission control line EML1 and may be electrically connected between the third node N3 and the fourth node N4. Such a fourth transistor T4 may also be referred to as a "first light emitting transistor".

The fifth transistor T5 may be controlled by a second light emission signal EM2 applied to a second light emission control line EML2 and may be electrically connected between the driving voltage line DVL and the first node N1. Such a fifth transistor T5 may also be referred to as a "second light emitting transistor".

The sixth transistor T6 may be controlled by the first scan signal SCAN1 applied to the first scan line SCL1 and may be electrically connected between an initialization voltage line IVL and the fourth node N4. Such a sixth transistor T6 may also be referred to as an "initialization transistor".

The capacitor Cst may be electrically connected between the second node N2 and the fourth node N4 and can maintain the data voltage Vdata supplied to the third node N3 through the first transistor T1 for one frame.

The light emitting device EL is electrically connected between the fourth node N4 and a line to which a ground voltage VSS is applied, and may be, for example, an organic light emitting diode (OLED).

Figure 4A:
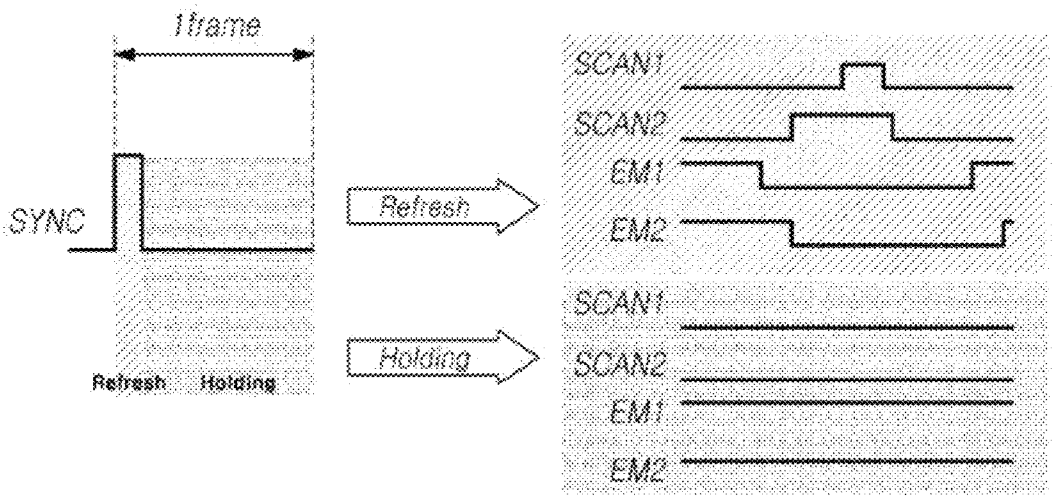
FIGS. 4A and 4B show an example of a drive timing of the subpixel shown in FIG. 3.
Figure 4B:
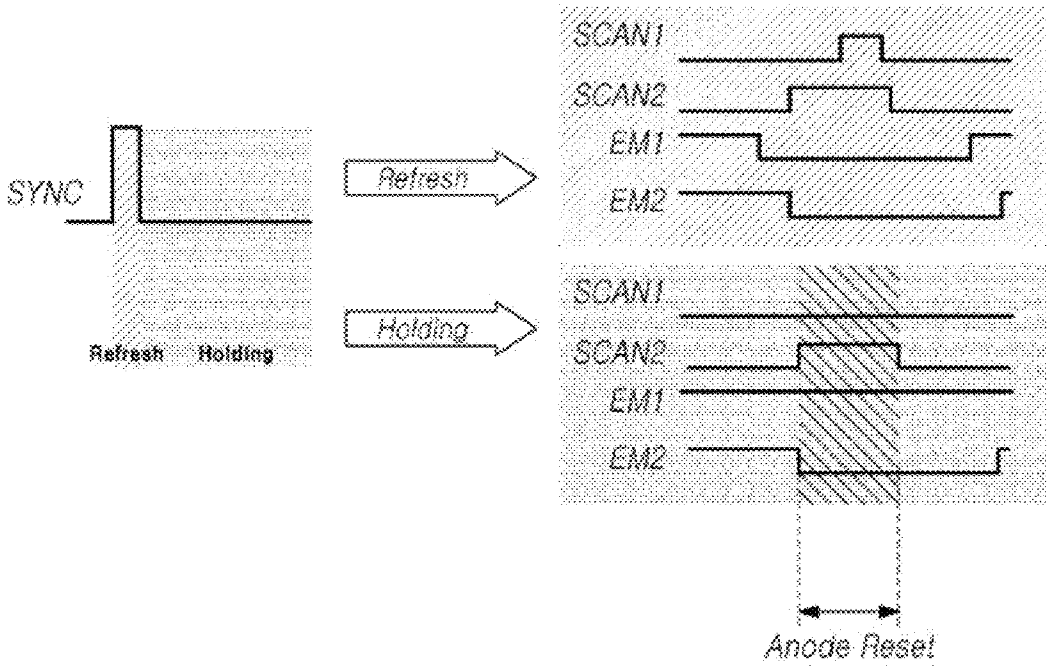

FIGS. 4A and 4B show an example of the drive timing of the subpixel shown in FIG. 3.

Referring to FIGS. 4A and 4B, one frame period may be divided into a refresh period and a holding period in accordance with a synchronization signal SYNC.

The display device according to the embodiment may operate in a low-speed driving mode and a high-speed driving mode. In the low-speed driving mode, the display device controls the holding period to be longer for a unit time and controls the refresh period to be shorter. When the display device operates at a low speed, power consumption can be reduced.

The refresh period may be subdivided into an initialization period, a sampling period, a programming period, and a light emission period.

During the initialization period, the data voltage written in the light emitting device EL is initialized by applying an initialization voltage Vini to the subpixel SP. During the sampling period, the threshold voltage Vth of the driving transistor T2 is stored in the capacitor connected to the driving transistor T2. During the programming period, the data voltage Vdata is applied to the subpixel SP, and thus, the data voltage Vdata is stored in the capacitor connected to the driving transistor T2.

The sampling period and the programming period are conceptually distinguished. The sampling period and the programming period are separated from each other according to the subpixel structure so that the operations in the periods may be sequentially operated or may be operated at the same time. In the subpixel structure described in the embodiment of the present disclosure, the operations in the sampling period and the operations in the programming period may be performed simultaneously. Hereinafter, the sampling period will be described with the inclusion of programming period.

During the holding period, the data voltage is not supplied through the data lines connected to the light emitting devices, respectively, and the light emitting devices emit light by using the data voltage stored in a refresh frame as it is.

In FIG. 4A, the holding period includes only the light emission period, and FIG. 4B includes an anode reset period.

In FIG. 4A, during the holding period, the first scan signal SCAN1 and the second scan signal SCAN2 maintain a low level, and the first light emission signal EM1 and the second light emission signal EM2 maintain a high level.

According to various embodiments, a reset voltage for resetting the anode electrode of the light emitting device EL may be periodically supplied through the data line DL during the holding period.

As shown in FIG. 4B, in the holding period, during a period in which the anode electrode of the light emitting device EL is reset, the second scan signal SCAN2 may be applied at a high level (e.g., may be in a high-level state), and the second light emission signal EM2 may be applied at a low level (e.g., may be in a low-level state). That is, in a state where the low level of the first scan signal SCAN1 and the high level of the first light emission signal EM1 are maintained, the levels of the second scan signal SCAN2 and the second light emission signal EM2 may be changed. The reset voltage may be supplied through the data line DL in a period in which the second scan signal SCAN2 is applied at a high level. It should be appreciated that "high level" and "low level" may refer to different levels in different signals. For example, the high level of the first scan signal SCAN1 may be higher or lower (e.g., have a higher or lower voltage) than the high level of the second scan signal SCAN2, the first light emission signal EM1 or the second light emission signal EM2. Similarly, the low level of the first scan signal SCAN1 may be lower or higher (e.g., have a lower or higher voltage) than the low level of the second scan signal SCAN2, the first light emission signal EM1 or the second light emission signal EM2. Generally, the high level of a signal (e.g., the first scan signal SCAN1) will be higher (e.g., have a higher voltage) than the low level of the same signal. It should also be appreciated that the "high level" may refer to a voltage level sufficient to turn on a transistor, and the "low level" may refer to a voltage level sufficient to turn off the transistor. For example, the high level of the second scan signal SCAN2 which is applied to the gate electrode of the first transistor T1 (see FIG. 3) may be at a voltage sufficiently high (e.g., greater than a threshold voltage of the first transistor T1) to turn on the first transistor T1. "Turn on" may refer to the transistor being in a saturated state (e.g., gate-source voltage is greater than threshold voltage), though other conductive states of the transistor may also be embodied in the term "turn on." "Turn off" may refer to the transistor being in a non-conductive or very-low-conductive state.

Hereinafter, a process in which a subpixel is driven according to the initialization period, sampling period, and light emission period will be described in detail with reference to FIGS. 5 to 7.

In FIGS. 4A and 4B, a case in which the second scan signal SCAN2 is applied at a high level prior to the first scan signal SCAN1 has been described as an example. In FIGS. 5 to 8, a case in which the first scan signal SCAN1 is applied at a high level prior to the second scan signal SCAN2 will be described as an example.

FIGS. 5 to 8 show an example of a process of driving the subpixel.

Initialization Period Ti

Figure 5:
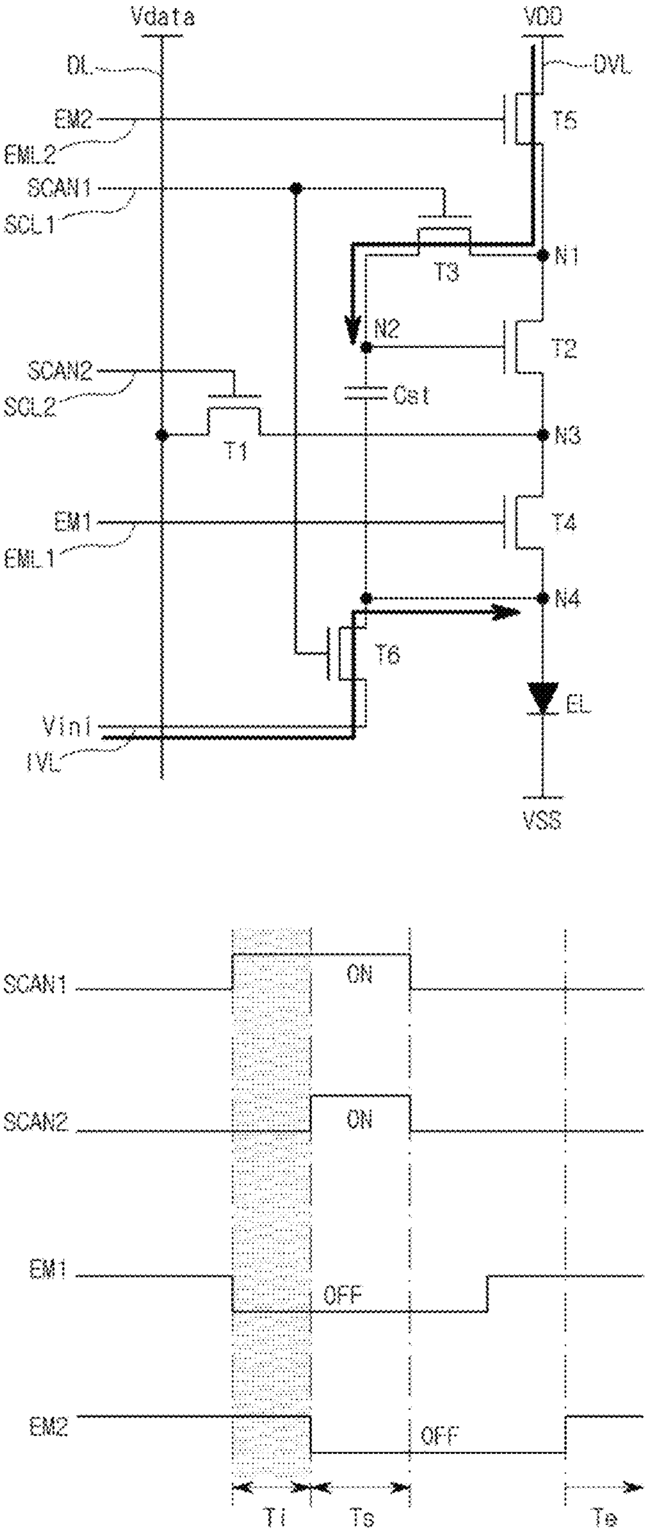
FIGS. 5 to 7 show an example of a process of driving the subpixel circuit.

FIG. 5 shows the initialization period. During the initialization period Ti, the fourth node N4 to which the anode electrode of the light emitting device EL of the subpixel SP is connected is initialized. Also, the second node N2 connected to the gate electrode of the second transistor T2 which corresponds to the driving transistor is initialized to the high potential power supply voltage VDD.

In the initialization period, in a state in which the first scan signal SCAN1 is applied at a high level ON and the second scan signal SCAN2 is applied at a low level, the first light emission signal EM1 is applied at a low level and the second light emission signal EM2 is applied at a high level.

Since the first scan signal SCAN1 is applied at a high level, the third transistor T3 and the sixth transistor T6 are turned on. Also, since the second light emission signal EM2 is applied at a high level, the fifth transistor T5 is turned on.

Also, since the second scan signal SCAN2 is applied at a low level, the first transistor T1 is turned off. Also, since the first light emission signal EM1 is applied at a low level OFF, the fourth transistor T4 is turned off.

Since the third transistor T3 and the fifth transistor T5 are in a turned-on state, the high potential power supply voltage VDD is applied to the second node N2 via the fifth transistor T5 and the third transistor T3.

Since the sixth transistor T6 is in a turned-on state, the initialization voltage Vini is applied to the fourth node N4, and the data voltage Vdata and the initialization voltage Vini may be applied to both ends of the capacitor Cst.

Sampling Period Ts

Figure 6:
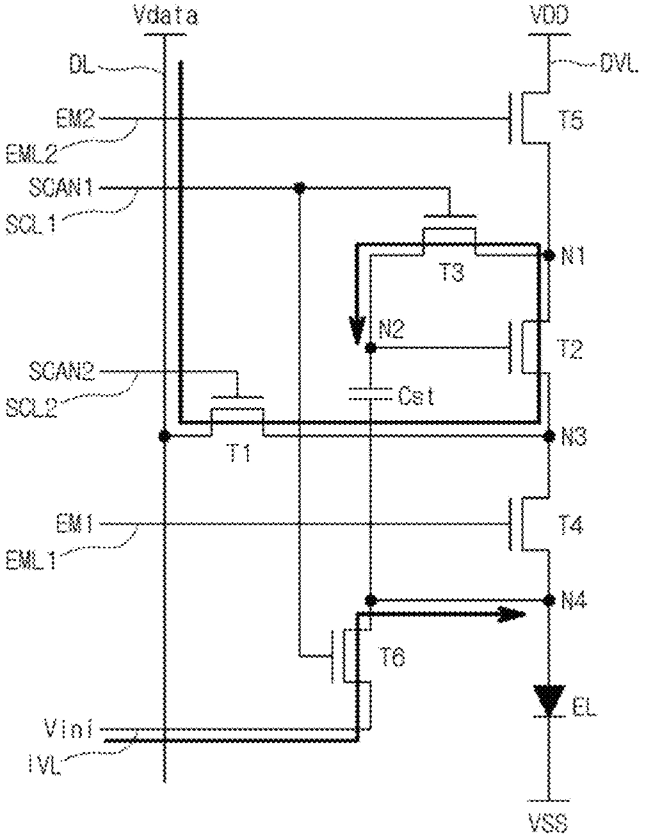
Figure 6:
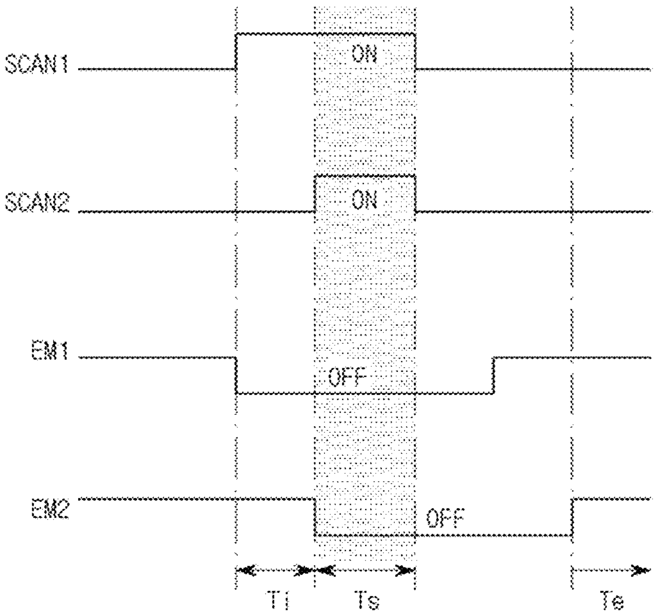

FIG. 6 shows the sampling period. During the sampling period Ts, the data voltage Vdata is supplied to the capacitor Cst of the subpixel, and the data voltage Vdata compensated by as much as the threshold voltage of the second transistor T2 which corresponds to the driving transistor is charged in the capacitor Cst.

In a state where the first scan signal SCAN1 and the second scan signal SCAN2 are applied at a high level in the sampling period Ts, the first light emission signal EM1 and the second light emission signal EM2 are applied at a low level.

Since the first scan signal SCAN1 and the second scan signal SCAN2 are applied at a high level, the first transistor T1, the second transistor T2, the third transistor T3, and the sixth transistor T6 are turned on.

Also, since the first light emission signal EM1 and the second light emission signal EM2 are applied at a low level, the fourth transistor T4 and the fifth transistor T5 are turned off.

Since the sixth transistor T6 is still in a turned-on state, the initialization voltage Vini may be applied to the fourth node N4.

Since the first transistor T1 is in a turned-on state, the data voltage Vdata may be applied to the third node N3. Since the third transistor T3 is in a turned-on state, the data voltage Vdata applied to the third node N3 is applied to the second node N2 via the first node N1. Here, a voltage obtained by subtracting the threshold voltage Vth of the second transistor T2 from the data voltage Vdata, that is, a value of "Vdata−Vth" may be applied to the second node N2. Accordingly, the driving current Id which is supplied to the light emitting device by the second transistor T2 is not affected by the threshold voltage Vth. That is, the threshold voltage of the second transistor T2 is compensated.

That is, in the sampling period Ts, the compensation circuit performs a sampling operation of saturating the second transistor T2 to a certain level by increasing a gate voltage of the second transistor T2 that is the driving transistor to a certain level in a source follower manner.

Sufficient time is beneficial to saturate the gate voltage of the second transistor T2 to a desired level. Here, in the trend of high-resolution and high-speed driving, it is difficult to obtain such a time. This is because one horizontal period during which data is written to the pixels in one line in the display panel is reduced with the increase of the resolution and the increase of a driving frequency. One horizontal period is a time for writing data to pixels arranged in one horizontal line on the screen, and corresponds to a high-level period of the second scan signal SCAN2 in the subpixel structure according to the embodiment.

The present disclosure proposes that, as a means for obtaining a time beneficial to saturate the gate voltage of the second transistor T2 to a desired level even in the trend of high-resolution and high-speed driving, a width of the high-level period of the first scan signal SCAN1 should be greater than a width of the high-level period of the second scan signal SCAN2. This will be described later in detail with reference to FIG. 8.

Light Emission Period Te

Figure 7:
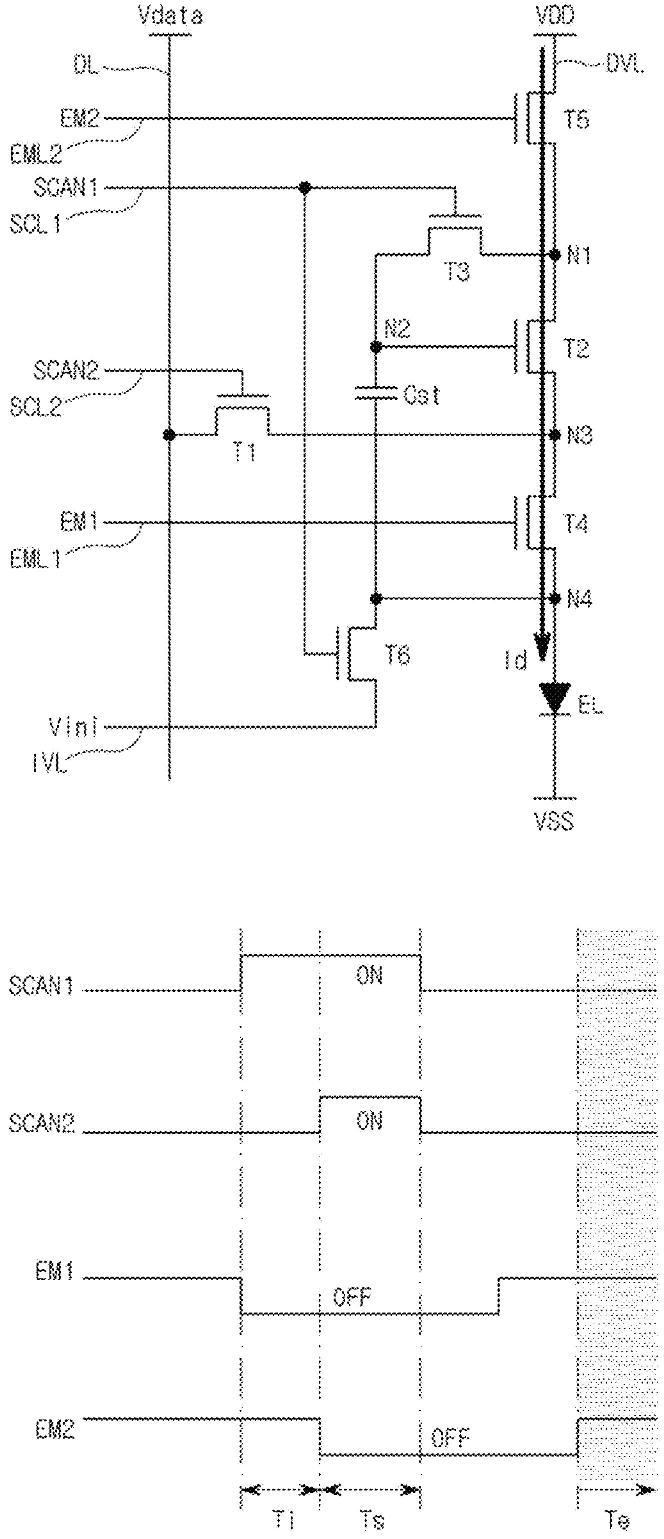

FIG. 7 shows the light emission period. The current Id corresponding to the data voltage Vdata flows through the second transistor T2 in the subpixel SP during the light emission period Te, and the light emitting device EL starts to emit light.

In the light emission period Te, the first scan signal SCAN1 and the second scan signal SCAN2 are applied at a low level, and the first light emission signal EM1 and the second light emission signal EM2 are applied at a high level.

Accordingly, in a state where the first transistor T1, the third transistor T3, and the sixth transistor T6 are in a turned-off state, the fourth transistor T4 and the fifth transistor T5 are turned on.

Since the data voltage Vdata has been applied to the gate node of the second transistor T2 and the initialization voltage Vini has been applied to the fourth node N4, the current Id corresponding to the data voltage Vdata flows through the second transistor T2, and the light emitting device EL starts to emit light.

Figure 8:
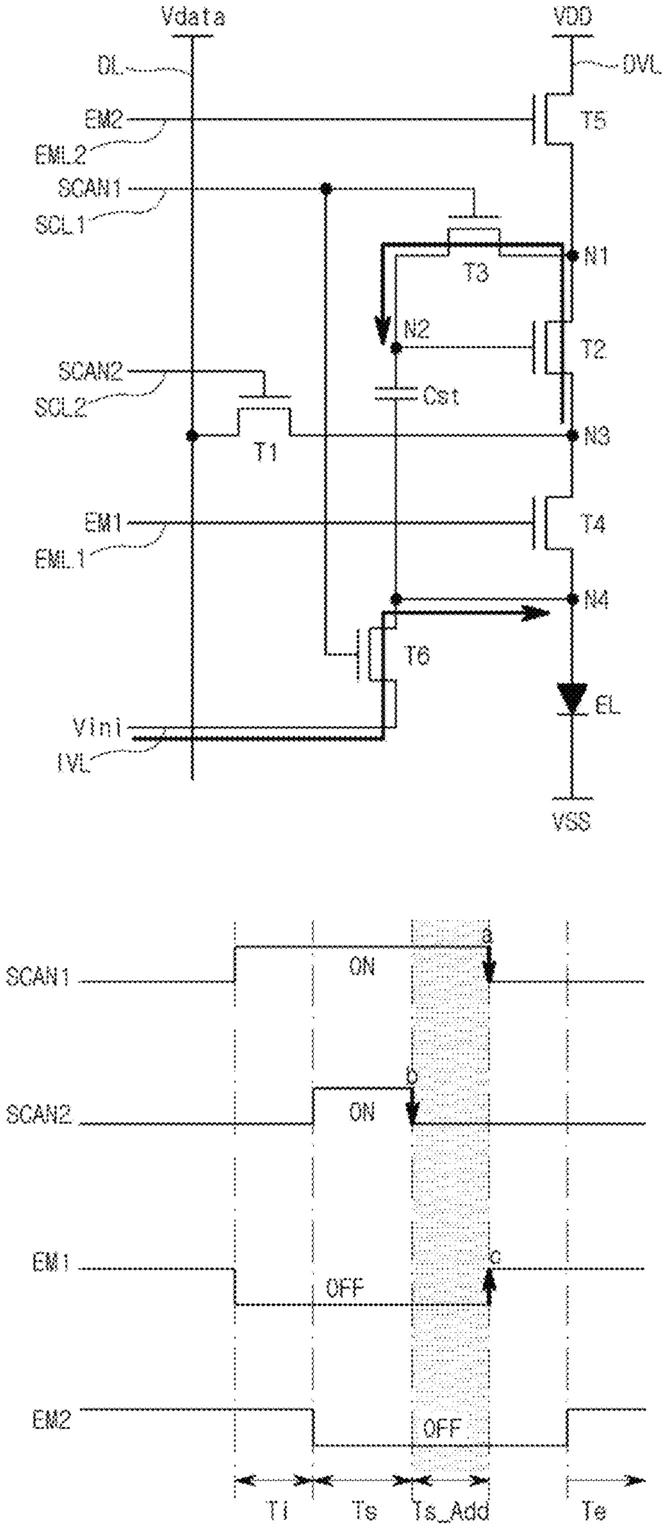
FIG. 8 shows an example of a process of driving the subpixel circuit during an additional sampling period.

FIG. 8 shows an example of a process of driving the subpixel circuit during an additional sampling period.

As described in FIG. 6, it has been described that as the resolution and the driving frequency are increased, one horizontal period is reduced so that the threshold voltage of the second transistor (driving transistor, T2) is incorrectly sensed and therefore, there occurs a difference in drive characteristics between the subpixels. This causes a difference in luminance, so that spots are generated on the display screen.

The present disclosure proposes that, as a means for obtaining a time beneficial to saturate the gate voltage of the second transistor T2 to a desired level even in the trend of high-resolution and high-speed driving, the width of the high-level period (ON pulse) of the first scan signal SCAN1 should be greater than the width of the high-level period (ON pulse) of the second scan signal SCAN2.

The embodiment of FIG. 8 is characterized in that the width of the high-level period of the first scan signal SCAN1 is greater than the width of the high-level period of the second scan signal SCAN2. In other words, a point of time "a" when the first scan signal SCAN1 is switched from a high level to a low level should be later than a point of time point "b" when the second scan signal SCAN2 is switched from a high level to a low level.

That is, in the embodiment of FIG. 6, the point of time when the first scan signal SCAN1 is switched from a high level to a low level has been earlier than or equal to the point of time point when the second scan signal SCAN2 is switched from a high level to a low level (FIG. 6 shows that the points of time are equal to each other). The one horizontal period bound to be reduced in the trend of high-resolution and high-speed driving. When driven as shown in the embodiment of FIG. 6, there may occur a problem that a threshold voltage sampling period of the driving transistor (second transistor T2) becomes insufficient.

However, when the width of the high-level period of the first scan signal SCAN1 is, as shown in FIG. 8, greater than the width of the high-level period of the second scan signal SCAN2, an additional sampling period Ts_Add can be obtained.

The threshold voltage of the second transistor T2 can be continued to be sensed by the data voltage Vdata applied to the third node N3 during the additional sampling period Ts_Add.

During the additional sampling period Ts_Add, the second scan signal SCAN2, the first light emission signal EM1, and the second light emission signal EM2 are applied at a low level in the state where the first scan signal SCAN1 is applied at a high level.

Since the first scan signal SCAN1 is applied at a high level, the second transistor T2, the third transistor T3, and the sixth transistor T6 are turned on.

Also, since the second scan signal SCAN2, the first light emission signal EM1, and the second light emission signal EM2 are applied at a low level, the first transistor T1, the fourth transistor T4, and the fifth transistor T5 are turned off.

Since the sixth transistor T6 is still in a turned-on state, the initialization voltage Vini may be applied to the fourth node N4.

Since the third transistor T3 is in a turned-on state, the data voltage Vdata applied to the third node N3 is applied to the second node N2 through the first node N1. Here, a voltage obtained by subtracting the threshold voltage of the second transistor T2 from the data voltage Vdata is applied to the second node N2. Accordingly, the threshold voltage of the second transistor T2 can be continued to be sensed during the additional sampling period Ts_Add. In other words, the third transistor T3 is turned off later than the first transistor T1, causing the voltage applied to the third node is transmitted to the second node via the first node, and the threshold voltage of the second transistor T2 is continued to be sensed during the sampling period Ts.

Meanwhile, by the method of obtaining the additional sampling period Ts_Add, the width of the high-level period of the first scan signal SCAN1 cannot be infinitely greater than the width of the high-level period of the second scan signal SCAN2. In many embodiments, the sampling period including the additional sampling period Ts_Add is desired to be made within a period in which the fourth transistor T4 maintains a turned-off state. When the fourth transistor T4 is turned on, the voltage of the third node N3 is changed, so that the threshold voltage of the second transistor T2 is incorrectly sensed. Therefore, in many embodiments, the additional sampling period Ts_Add is made within a period in which the fourth transistor T4 maintains a turn-off state maximally. That is, the point of time “a” when the first scan signal SCAN1 is switched from a high level to a low level should be equal to or earlier than a point of time “c” when the first light emission signal EM1 is switched from a low level to a high level.

In summary again, the point of time “a” when the first scan signal SCAN1 is switched from a high level to a low level should be later than the point of time point “b” when the second scan signal SCAN2 is switched from a high level to a low level. Also, the point of time “a” when the first scan signal SCAN1 is switched from a high level to a low level should be earlier than the point of time “c” when the first light emission signal EM1 is switched from a low level to a high level (point of time “b” <point of time “a” <point of time “c”).

Figure 9:
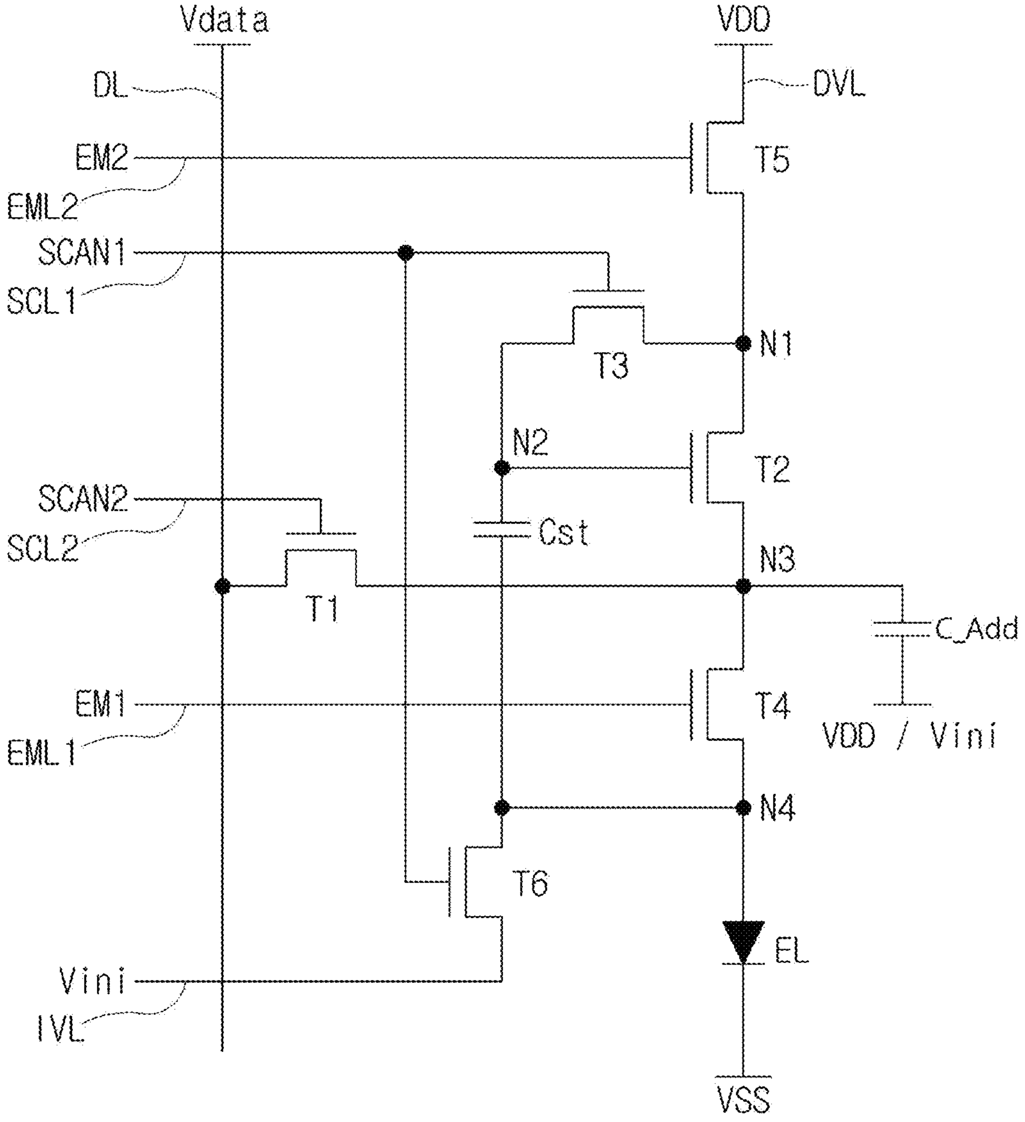
FIG. 9 shows an example of the structure of the subpixel circuit having a compensation capacitor added thereto.

FIG. 9 shows an example of the structure of a subpixel circuit having a compensation capacitor added thereto.

The subpixel circuit of the embodiment of FIG. 9 is different from the subpixel circuit of FIG. 3 in that a compensation capacitor C_Add is additionally included. As shown in FIG. 9, the first electrode of the compensation capacitor C_Add is connected to the third node N3. The source electrode of the second transistor T2 and the drain electrode of the fifth transistor T5 are connected to the first node N1. The second electrode of the compensation capacitor C_Add according to the embodiment may be connected such that the high potential power supply voltage VDD is applied. Specifically, the second electrode is configured to be connected to the driving voltage line DVL and receives the high potential power supply voltage VDD. The second electrode of the compensation capacitor C_Add according to another embodiment may be connected such that the initialization voltage Vini is applied. Specifically, the second electrode is configured to be connected to the initialization voltage line IVL and receives the initialization voltage Vini.

As described above in FIG. 8, the present disclosure has described that, as a means for obtaining a time beneficial to saturate the gate voltage of the second transistor T2 to a desired level even in the trend of high-resolution and high-speed driving, the method in which the width of the high-level period of the first scan signal SCAN1 is greater than the width of the high-level period of the second scan signal SCAN2 so that the threshold voltage of the second transistor T2 is continued to be sensed by the data voltage Vdata applied to the third node N3 during the additional sampling period Ts_Add.

In the subpixel circuit of the embodiment of FIG. 9, the compensation capacitor C_Add functions to maintain the data voltage Vdata applied to the third node N3. This is because the data voltage Vdata applied to the third node N3 needs to be maintained in order that the threshold voltage of the second transistor T2 is continued to be sensed by the data voltage Vdata applied to the third node N3 during the additional sampling period Ts_Add. As a result, the compensation capacitor C_Add is connected to the third node N3, so that the efficiency of the voltage supplied to the second node of the second transistor T2 which operates as a source-follower is increased.

Figure 10:
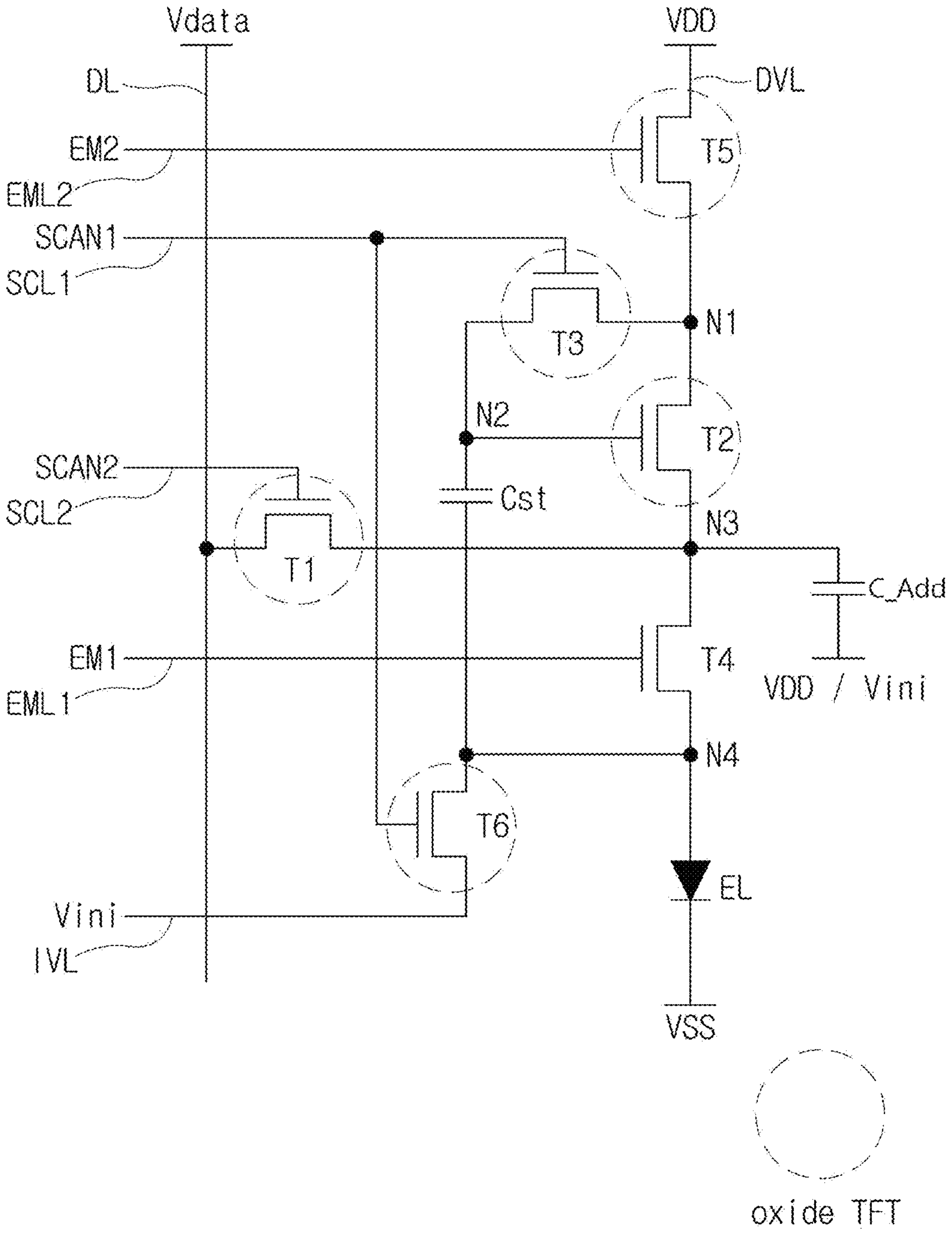
FIG. 10 shows an embodiment, different from that of FIG. 9, in which some TFT elements constituting the subpixel circuit are composed of or include an oxide.

FIG. 10 shows an embodiment different from that of FIG. 9 and shows an example in which some TFT elements constituting the subpixel circuit is composed of or includes an oxide.

The display device 100 including a multi-type TFT according to the embodiment of the present disclosure includes a pixel driving circuit in which a switching TFT is made of an oxide semiconductor TFT and a driving TFT is made of a LTPS TFT. However, in the organic light emitting display device 100 of the present disclosure, the switching TFT is not limited to the oxide semiconductor TFT and the driving TFT is not limited to the LTPS TFT, and the pixel driving circuit may be composed of or include various multi-type TFTs. Also, in the display device 100, the pixel driving circuit may include one type of a TFT instead of multi-type TFTs.

In the embodiment of FIG. 10, among the transistors constituting the subpixel SP circuit, the first transistor T1, the second transistor T2, and the fifth transistor T5 may be composed of or include an oxide semiconductor transistor which uses an oxide semiconductor material as an active layer.

Also, in another embodiment, the third transistor T3 and the sixth transistor T6 may be formed of an oxide semiconductor transistor which uses an oxide semiconductor material as an active layer.

In another embodiment, the remaining transistors T1, T2, T3, T5, and T6 other than the fourth transistor T4 may be composed of or include an oxide semiconductor transistor which uses an oxide semiconductor material as an active layer.

Since the oxide semiconductor material has a low off-current, it may be suitable for a switching TFT that has a short turn-on time and a long turn-off time. The oxide semiconductor TFT has better voltage holding characteristics than the LTPS TFT.

When the first transistor T1, the second transistor T2, and the fifth transistor T5 are composed of or include the oxide semiconductor transistor which uses an oxide semiconductor material as an active layer, they can be useful for maintaining the voltage of the third node N3.

For the same reason, when the third transistor T3 and the sixth transistor T6 are composed of or include the oxide semiconductor transistor which uses an oxide semiconductor material as an active layer, they can be useful for maintaining the voltages of the second node N2 and the capacitor Cst.

Figure 11:
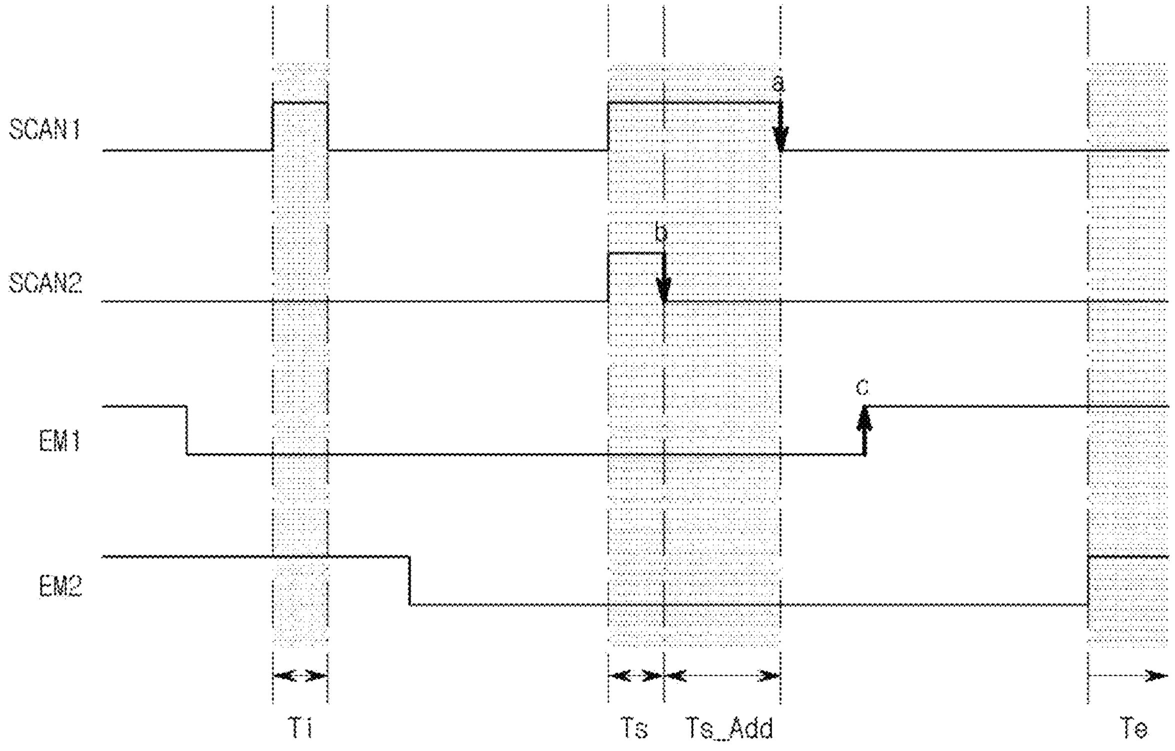
FIG. 11 shows another example of the drive timing of the subpixel shown in FIG. 3.

FIG. 11 shows another example of the drive timing of the subpixel shown in FIG. 3. Reference to "on and off operations" may refer to operations (e.g., application of voltages) that turn on or turn off a transistor, respectively. Taking the first transistor T1 as an example, an "on operation" of the first transistor T1 may turn on the first transistor T1, for example, by applying the first scan signal SCAN1 at the high level (e.g., the voltage greater than the threshold voltage of the first transistor T1) to the gate electrode of the first transistor T1. An "off operation" of the first transistor T1 may turn off the first transistor T1, for example, by applying the first scan signal SCAN1 at the low level (e.g., the voltage less than the threshold voltage of the first transistor T1) to the gate electrode of the first transistor T1. The "off operation" may also be referred to as a "turn-off operation." The "on operation" may also be referred to as a "turn-on operation."

The first scan signal SCAN1 controls on and off operations of the third transistor T3 and the sixth transistor T6.

The second scan signal SCAN2 controls the on and off operations of the first transistor T1.

The first light emission signal EM1 controls the on and off operations of the fourth transistor T4.

The second light emission signal EM2 controls the on and off operations of the fifth transistor T5.

The drive timing shown in FIG. 11 is different from the drive timing described above with reference to FIGS. 5 to 8 in that the first scan signal SCAN1 has two ON pulses.

Specifically, the first scan signal SCAN1 includes a first ON pulse and a second ON pulse following the first ON pulse.

During the first ON pulse period of the first scan signal SCAN1, the second scan signal SCAN2 and the first light emission signal EM1 are in a low-level state, and the second light emission signal EM2 is in a high-level state.

Accordingly, during the first ON pulse period, the subpixel is initialized (Ti) for initializing the voltage of the second node N2 to the high potential power supply voltage VDD.

During a part of the second ON pulse period of the first scan signal SCAN1, the second scan signal SCAN2 is in a high-level state, and during the second ON pulse period of the first scan signal SCAN1, the first light emission signal EM1 and the second light emission signal EM2 are in a low-level state.

Therefore, during the second ON pulse period, the subpixel samples (Ts) the threshold voltage Vth of the second transistor T2, that is to say, stores the threshold voltage Vth of the second transistor T2 in the voltage of the second node N2. Specifically, regarding the voltage of the second node N2, a voltage obtained by subtracting the threshold voltage Vth of the second transistor T2 from the data voltage Vdata, that is, a value of "Vdata−Vth" may be applied to the second node N2.

As described above, the display device according to the embodiments additionally samples the threshold voltage of the driving transistor even after one horizontal period, thereby obtaining sufficient time for sampling the threshold voltage of the driving transistor even in a high-speed driving or high-resolution display device. Furthermore, there is an effect of reducing a luminance deviation between the pixels by improving the compensation rate of the internal compensation circuit.

While the embodiment of the present disclosure has been described with reference to the accompanying drawings, it can be understood by those skilled in the art that the present disclosure can be embodied in other specific forms without departing from its spirit or technical characteristics. Therefore, the foregoing embodiments and advantages are merely and are not to be construed as limiting the present disclosure. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent in operation structures.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel on which a plurality of gate lines, a plurality of data lines and a plurality of subpixels are disposed; and a gate driving circuit that, in operation, outputs a plurality of gate signals to the plurality of gate lines;

wherein each of the plurality of subpixels includes:

a light emitting device;

a driving transistor that, in operation, drives the light emitting device;

wherein the plurality of gate signals include a plurality of scan signals and at least one emission signal, which are respectively applied to different gate lines of the plurality of gate lines, and wherein the display panel is driven in a frame including a refresh period and a holding period in accordance with whether a data voltage is applied to the light emitting device in the subpixels, wherein the refresh period includes an initialization period, a sampling period, an additional sampling period, a programming period and a light emission period; and the holding period includes the light emission period.

2. The display device of claim 1, wherein the driving transistor is an N-type transistor.

3. The display device of claim 1, wherein the plurality of scan signal includes a first scan signal and a second scan signal, and wherein the first scan signal and the second scan signal have different turn-on times.

4. The display device of claim 3, wherein the first scan signal and the second scan signal have different pulse widths.

5. The display device of claim 1, each of the plurality of subpixels further includes:

at least one switching transistor including an oxide semiconductor material.

6. The display device of claim 5, wherein the at least one switching transistor includes:

a first transistor electrically connected between a first electrode of the driving transistor and a data line, which, in operation, receives the second scan signal through a first gate electrode; and a third transistor electrically connected between a second electrode of the driving transistor and a gate electrode of the driving transistor, which, in operation, receives the first scan signal through a third gate electrode.

7. The display device of claim 3, wherein a pulse width of the first scan signal is shorter than a pulse width of the second scan signal.

8. The display device of claim 6, wherein the at least one emission signal includes a first light emission signal and a second light emission signal, and wherein during the holding period, the first light emission signal and the second light emission signal have different waveforms.

9. The display device of claim 8, wherein the first light emission signal has a different waveform in the refresh period and the holding period.

10. The display device of claim 9, wherein, during the holding period, the first light emission signal is a turn on level.

11. The display device of claim 8, wherein the second light emission signal has a same waveform in the refresh period and the holding period.

12. The display device of claim 8, wherein, in operation, each of the plurality of subpixels receives an initialization voltage through an initialization voltage line during an initialization period.

13. The display device of claim 12, wherein each of the plurality of subpixels further includes:

a fourth transistor electrically connected between the driving transistor and the light emitting device, which, in operation, receives the at least one light emission signal through a fourth gate electrode;

a fifth transistor electrically connected between the driving transistor and a driving voltage line, which, in operation, receives the second light emission signal through a fifth gate electrode; and a sixth transistor electrically connected between the light emitting device and the initialization voltage line, which, in operation, receives a first gate signal through a sixth gate electrode.

14. The display device of claim 13, wherein in operation:

the first transistor performs a turn-on operation during the sampling period;

the third transistor performs a turn-on operation during the initialization period;

the fourth transistor performs a turn-off operation during the initialization period, the sampling period and the additional sampling period; and the fifth transistor performs a turn-off operation during the sampling period and the additional sampling period.

15. The display device of claim 13, wherein each of the plurality of subpixels further comprises a compensation capacitor connected to the first electrode of the driving transistor.

16. The display device of claim 15, wherein the compensation capacitor is further connected to the driving voltage line and, in operation, receives a high potential power supply voltage or is connected to the initialization voltage line and, in operation, receives the initialization voltage.

17. A display device, comprising:

a display panel on which a plurality of gate lines, a plurality of data lines and a plurality of subpixels are disposed; and a gate driving circuit that, in operation, outputs gate signals to the plurality of gate lines;

wherein each of the plurality of subpixels include:

a light emitting device;

a driving transistor that, in operation, drives the light emitting device; and at least one switching transistor including an oxide semiconductor material;

wherein the driving transistor and the at least one switching transistor are N-type transistors, and wherein the plurality of gate signals include a plurality of scan signals and at least one emission signal which are respectively applied to different gate lines of the plurality of gate lines, wherein a refresh period includes an initialization period, a sampling period, an additional sampling period, a programming period and a light emission period; and a holding period includes the light emission period.

18. The display device of claim 17, wherein:

the plurality of scan signals include a first scan signal and a second scan signal;

the at least one emission signals include a first light emission signal and a second light emission signal; and the first scan signal, the second scan signal, the first light emission signal and the second light emission signal are respectively applied to different gate lines of the plurality of gate lines.

* * * * *